US007007788B2

(12) United States Patent
Dunlop et al.

(10) Patent No.: US 7,007,788 B2
(45) **Date of Patent: *Mar. 7, 2006**

(54) BANKNOTE VALIDATOR

(75) Inventors: Peter Dunlop, Cheshire (GB); Kevin Ashurst, Huddersfiels (GB)

(73) Assignee: Innovative Technology Limited, Oldham (GB)

(*) Notice: Subject to any disclaimer, the term of this patent is extended or adjusted under 35 U.S.C. 154(b) by 25 days.

This patent is subject to a terminal disclaimer.

(21) Appl. No.: 10/044,550

(22) Filed: Jan. 11, 2002

(65) Prior Publication Data

US 2002/0108891 A1 Aug. 15, 2002

Related U.S. Application Data

(63) Continuation of application No. 09/402,750, filed on Oct. 12, 1999, now Pat. No. 6,392,863.

(30) Foreign Application Priority Data

Feb. 19, 1998 (EP) ................................. 98301248

(51) Int. Cl.
*G06K 9/00* (2006.01)
*G06K 7/00* (2006.01)
*G07D 7/00* (2006.01)
*G07F 7/04* (2006.01)

(52) U.S. Cl. ........................ 194/207; 194/265; 324/22; 324/207; 382/135; 361/142; 209/534; 271/225; 271/227; 271/902

(58) Field of Classification Search ................ 250/216, 250/227.28, 227.11, 227.26, 227.31; 356/71; 382/135, 136, 137; 194/205–207, 328, 329, 194/330, 259, 265; 324/22, 207; 361/142; 271/225, 227, 228, 248, 250, 252, 902; 209/534; 232/58; 902/7, 8, 13–16

See application file for complete search history.

(56) References Cited

U.S. PATENT DOCUMENTS

| | | | | | |
|---|---|---|---|---|---|
| 3,220,549 | A | * | 11/1965 | Wong | 209/534 |
| 4,342,511 | A | * | 8/1982 | Routt et al. | 355/1 |
| 4,513,439 | A | | 4/1985 | Gorgone et al. | |
| 4,881,268 | A | | 11/1989 | Uchida et al. | |
| 5,034,616 | A | * | 7/1991 | Bercovitz | 250/556 |
| 5,136,144 | A | | 8/1992 | Swinton et al. | |
| 5,378,885 | A | | 1/1995 | Jones, Jr. et al. | |
| 5,408,312 | A | * | 4/1995 | Pries et al. | 356/236 |
| 5,461,239 | A | * | 10/1995 | Atherton | 250/566 |
| 5,540,425 | A | | 7/1996 | Graef et al. | |
| 5,662,201 | A | | 9/1997 | Gerlier et al. | |
| 5,696,607 | A | * | 12/1997 | Yamana et al. | 358/474 |
| 5,881,196 | A | * | 3/1999 | Phillips | 385/127 |

(Continued)

FOREIGN PATENT DOCUMENTS

DE 26 19 620 A1 1/1977

(Continued)

*Primary Examiner*—Donald P. Walsh
*Assistant Examiner*—Jeffrey A. Shapiro
(74) *Attorney, Agent, or Firm*—Dinsmore & Shohl LLP

(57) ABSTRACT

A banknote validator for determining the value and authenticity of a banknote is provided. The banknote validator includes a magnetic sensor, an optical sensor, and a non-return gate. The magnetic sensor includes a magnetic circuit and an electronic circuit. The optical sensor includes a trapezoidal light guide, a broadband light source for illuminating a banknote via the light guide, and sensors for detecting light reflected from the banknote. The non-return gate includes banknote-guiding means for guiding the banknote along a banknote path and for controlling the direction of the banknote's travel based on its acceptability.

37 Claims, 14 Drawing Sheets

U.S. PATENT DOCUMENTS

| | | | | | |
|---|---|---|---|---|---|
| 5,903,339 | A | * | 5/1999 | Levasseur | 356/71 |
| 5,966,205 | A | * | 10/1999 | Jung et al. | 356/71 |
| 6,072,560 | A | * | 6/2000 | Frick | 355/41 |
| 6,076,648 | A | * | 6/2000 | Hatamachi et al. | 194/206 |
| 6,094,281 | A | * | 7/2000 | Nakai et al. | 358/512 |
| 6,392,863 | B1 | * | 5/2002 | Dunlop et al. | 361/142 |

FOREIGN PATENT DOCUMENTS

| | | |
|---|---|---|
| DE | 27 13 396 | 9/1978 |
| EP | 0 768 643 | 4/1997 |
| GB | 1 510 934 | 5/1978 |
| JP | 05 159245 | 6/1993 |

* cited by examiner

BANKNOTE VALIDATOR

CROSS REFERENCE TO RELATED APPLICATIONS

This application is a continuation of U.S. patent application Ser. No. 09/402,750, filed Oct. 12, 1999, now U.S. Pat. No. 6,392,863, issued May 21, 2002.

The present invention relates to a banknote validator.

The term "banknote" is used herein for convenience and for ease of comprehension. However, it is to be interpreted as including any sheet-like objects having detectable features, for example tickets and vouchers, and fraudulent and counterfeit versions thereof.

It is known that magnetic signatures are printed on many types of banknote and that these signatures are consistent between banknotes of the same type. This property has been used by many manufacturers of banknote validators, in conjunction with optical methods, to determine the value of a banknote and to determine its authenticity.

Several sensor designs have been used to detect this signature, all of which have disadvantages. A simple type uses an inductive device, similar to those found in tape recorders. These devices are only suitable for use where the banknotes to be validated produce a strong magnetic field. Also, the output of the sensor is dependant on the speed of the banknote. Magneto-resistors have been used in various configurations and have proved not to be sensitive enough.

A derivative of the magneto-resistor is the giant magneto-resistor. These devices are extremely sensitive to small magnetic fields. They are so sensitive that they can detect ferrous materials at considerable distances, making the use of these devices in an unshielded plastic casing impractical. Furthermore, the range of fields that can be measured is very limited and fields from motors and power transformers easily overwhelm the field from a banknote. There are devices that address these problems. However the cost of these devices makes them unsuitable for use in a low cost banknote validator.

According to the present invention, there is provided a magnetic sensor comprising a magnetic circuit and an electronic circuit, the magnetic circuit comprising a yoke and a giant magneto-resistor and the electronic circuit comprising a coil arranged to generate a magnetic field in the yoke and a feedback control loop responsive to the output of the giant magneto-resistor to energise the coil so that the giant magneto-resistor operates in a predetermined region of its characteristic.

Preferably, the frequency response of the control system has a low-pass characteristic. Thus, the bias field applied to the giant magneto-resistor compensates for stationary and relatively slowly changing ambient magnetic fields. In the particular case of a magnetic sensor for a banknote validator, it has been found that a low-pass characteristic with a first order roll-off with a −3 dB point in the range 1 to 5 Hz is desirable. Preferably, however, the −3 dB point is at 2 Hz.

While large stationary or slowly changing ambient magnetic fields can be handled by feedback control of the giant magneto-resistor's magnetic bias, there remains the problem of more rapidly changing magnetic fields.

According to the present invention, there is provided a magnetic sensor comprising two giant magneto-resistors connected by a yoke, and a subtracter configured for subtracting the output of one of the giant magneto-resistors from that of the other, wherein the giant magneto-resistors are arranged such that only one of the giant magneto-resistors is significantly sensitive to magnetic fields generated in a sensing region and both giant magneto-resistors are sensitive to ambient magnetic fields. Consequently, the components of the giant magneto-resistor outputs due to ambient fields cancel and the output from the subtracter is substantially only dependent on the local field detected substantially by only one of the giant magneto-resistors.

The characteristics of the giant magneto-resistors need to be matched. This can be ensured by carefully selecting the giant magneto-resistors to be used together. A preferred alternative is to employ first bias means for applying a constant bias voltage to one of the giant magneto-resistors and second bias means for applying a variable bias voltage to the other giant magneto-resistor, the second bias means being responsive to the output of the subtracter to generate a bias voltage tending to cause the output of the subtracter to be zero. The closed-loop transfer function of the second bias means should be arranged such that desired signals are not significantly attenuated.

Preferably, the yoke comprises two connected arms, one giant magneto-resistor is mounted between free ends of the arms of the yoke, and the other giant magneto-resistor is mounted between the arms of the yoke between their interconnection and said one giant magneto-resistor.

The two techniques for dealing with interfering magnetic fields set out above are preferably combined.

It will be appreciated that applications of magnetic sensors according to the present invention extend far beyond the particular case of sensing magnetic characteristics of banknotes. For instance, such sensors could be used for sensing magnetic characteristics of coins or for reading magnetic recordings.

There are many methods of obtaining a characteristic waveform from a banknote using optical techniques. Typically, a banknote to be validated is illuminated with narrowband light and the amplitude of light reflected and/or transmitted by a banknote measured.

According to the present invention, there is provided a banknote validator including an optical sensor for sensing optical characteristics of a banknote being validated, the sensor comprising a light source, incident light-directing means for directing light from the light source onto a banknote being validated, a photodetector and reflected light-directing means for directing light from the light source, after reflection from a banknote being validated, to the photodetector, characterized in that the light source is a source of broadband light and an optical filter is interposed between reflected light-directing means and the photodetector.

This arrangement takes advantage of all of the light wavelengths that the banknote can reflectively filter. As a result, more distinctive information is yielded. Suitable broadband sources include incandescent bulbs of various types and also broadband light emitting diodes which produce light across substantially the whole of the visible spectrum. The filter responses of the receivers are such that the banknote's properties can be sorted into selected areas of activity to match the banknote designer's chosen wavelength response. When using a narrowband source, a truly distinctive characteristic is only obtained if the wavelength, produced by the narrowband source, is part of the filtering effect of the banknote.

Preferably, a light guide serves as the incident light-directing means and the reflected light-directing means. Conveniently, the light guide is a substantially trapezial, planar solid, the narrow end of which is adjacent the light source and the photodetector and the broad end of which is adjacent a banknote path.

Preferably, the optical sensor comprises a plurality of photodetectors and a plurality of optical filters to which light is directed by the reflected light-directing means, the optical filters having different transmission characteristics and being associated with respective photodetectors.

The filter may be one that passes primarily infrared light or blue-green light. Infrared and blue-green light-passing filters may be arranged in series. Filters having the following 3 dB stopbands have been found to be preferable:—420–720 nm and 480–540 nm together with >820 nm. The filters may be arranged in series.

When reflecting from a specular surface the power of light reflected back in a particular direction is proportional to the degree of specularity and the diffuse behaviour of the surface. Banknotes contain both specular and diffuse surfaces as part of their design, the main surface being predominantly diffuse. Areas of specular reflection are created by using highly reflective devices such as flechetes, plastic holograms, and metalised threads.

The present inventors have discovered that directing light obliquely onto a banknote helps to create highly distinctive waveforms when scanning banknotes using an opto-reflective technique.

According to the present invention, there is provided a banknote validator including an optical banknote sensor configured to sense light reflected by a banknote being validated, characterized in that the sensor is configured to sense light reflected obliquely from a banknote being validated.

Preferably, the sensor is configured to sense light reflected from a banknote being validated at an angle in the range 60° to 80° to the surface of the banknote at the point of reflection. 70° has been found to be the optimum angle.

Preferably, the optical banknote sensor comprises a light guide for guiding light from a banknote being validated to a photodetector. More preferably, the light guide comprises a transparent, trapezial, planar solid having a narrow end and a broad end, the narrow end being adjacent the photodetector and the broad end being adjacent a banknote path. The internal angles between the main faces of the light guide and the broad end face are preferably 70° and 110° respectively.

The same light guide may be used for directing sensing light from a light source onto a banknote being validated.

According to the present invention, there is provided a banknote validator comprising a banknote path, a non-return gate in the banknote path, reversible banknote driving means for driving a banknote in the banknote path, banknote characteristic sensing means and processing means operable to operate the banknote driving means in a first direction during sensing of banknote characteristics by the banknote characteristic sensing means and thereafter reverse the banknote driving means to reject or accept a banknote, wherein the processing means is responsive to the output of the banknote characteristic sensing means to identify an acceptable banknote and, if a banknote is identified as being acceptable, to reverse the banknote driving means only after the banknote has cleared the non-return gate. Such a banknote validator has the advantage of simplified control of the banknote driving means. The difference between a banknote being accepted and a banknote being rejected is the timing of the reversing of the banknote driving means.

Preferably, the non-return gate includes banknote-guiding means arranged for guiding an acceptable banknote along a banknote accept path when the banknote driving means is reversed. The banknote-guiding means may comprise a surface of a plurality of surfaces, arranged side-by-side. The banknote-guiding means is preferably curved in the direction of banknote travel. The smaller angle between the banknote guiding means and an acceptable banknote should be no more that 50° when the leading edge of the banknote contacts the banknote guiding means. If this angle is larger, the banknote is liable to crumple, jamming the validator.

Preferably, the non-return gate comprises pivotably mounted flap means biased into the banknote path and extending in the direction of travel of a banknote before reversal of the banknote driving means. More preferably, the flap means is pivoted into a open position by contact with a banknote passing in a banknote insertion direction along the banknote path. This has the advantage of avoiding the need for an actuator for opening and closing the non-return gate.

A preferred embodiment includes a rotatable banknote guide located behind the non-return gate and a banknote guide wall, and the banknote driving means includes a banknote driving wheel below the rotatable banknote guide, and an acceptable banknote is guided by the non-return gate and the banknote guide wall up and rearwardly over the rotatable banknote guide when the banknote driving means is reversed.

Preferably, the non-return gate extends substantially completely across the width of the banknote path.

Preferably, the underside of the flap means has a projection and the banknote path has a depression, the projection being received in the depression when the flap means is in its banknote path blocking position. There may be a plurality of such projections and depressions, for instance ribs on the flap means and grooves in the floor of the banknote path.

The various aspects of the present invention set out above may be embodied singly or in any combination in a banknote validator.

An embodiment of the present invention will now be described, by way of example, with reference to the accompanying drawings, in which.

Figure 1:
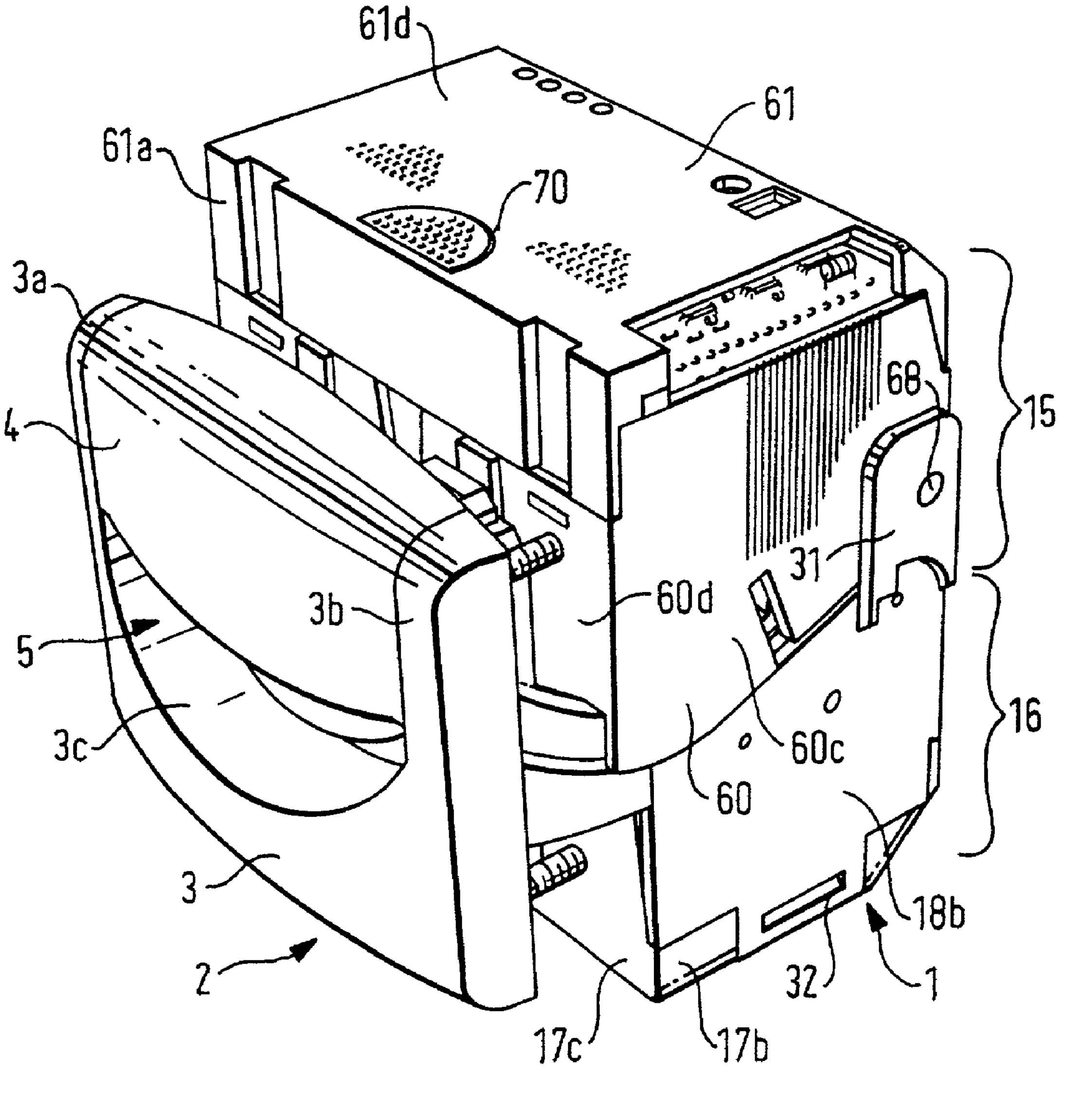
FIG. 1 is a front perspective view of a validator according to the present invention.
Figure 2:
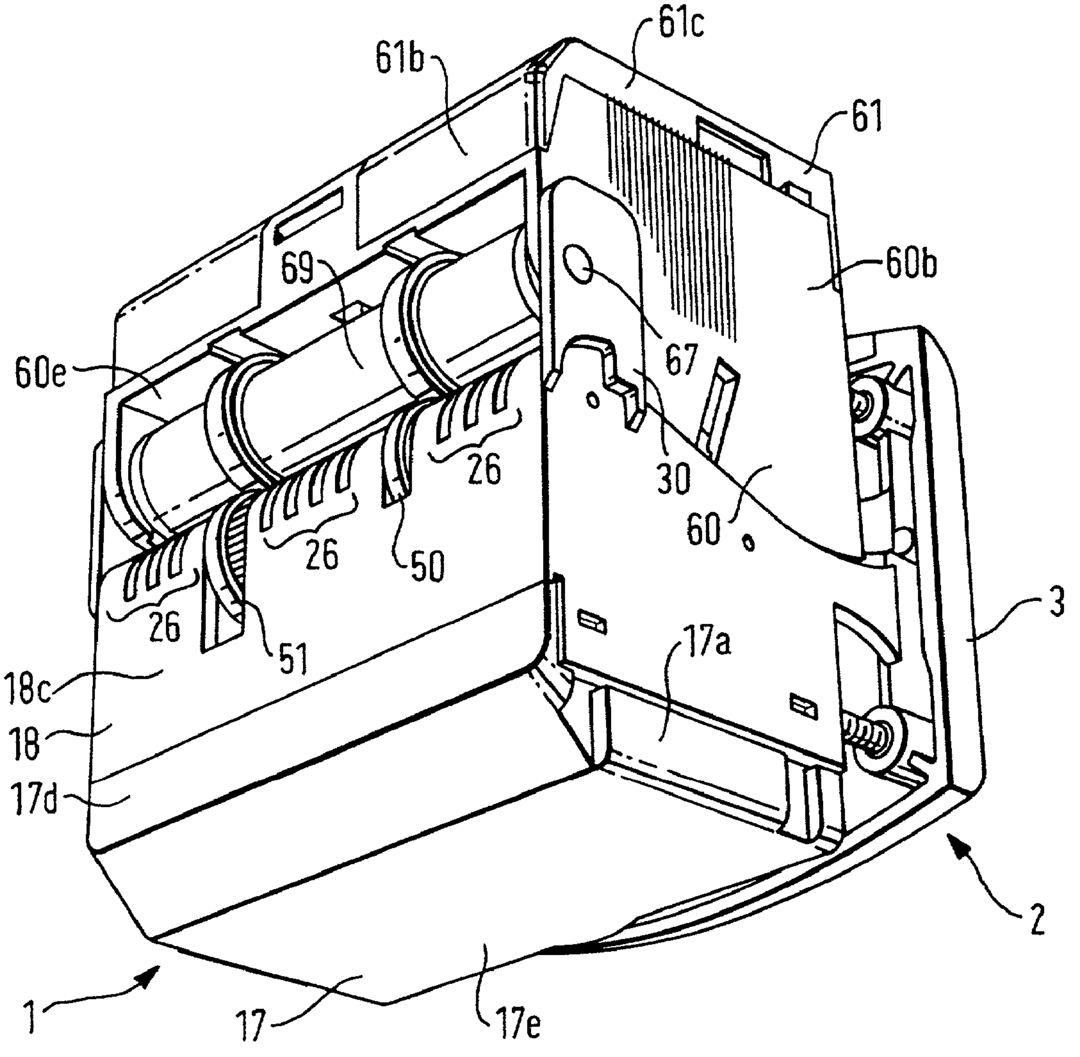
FIG. 2 is a rear perspective view of the validator of FIG. 1.
Figure 3:
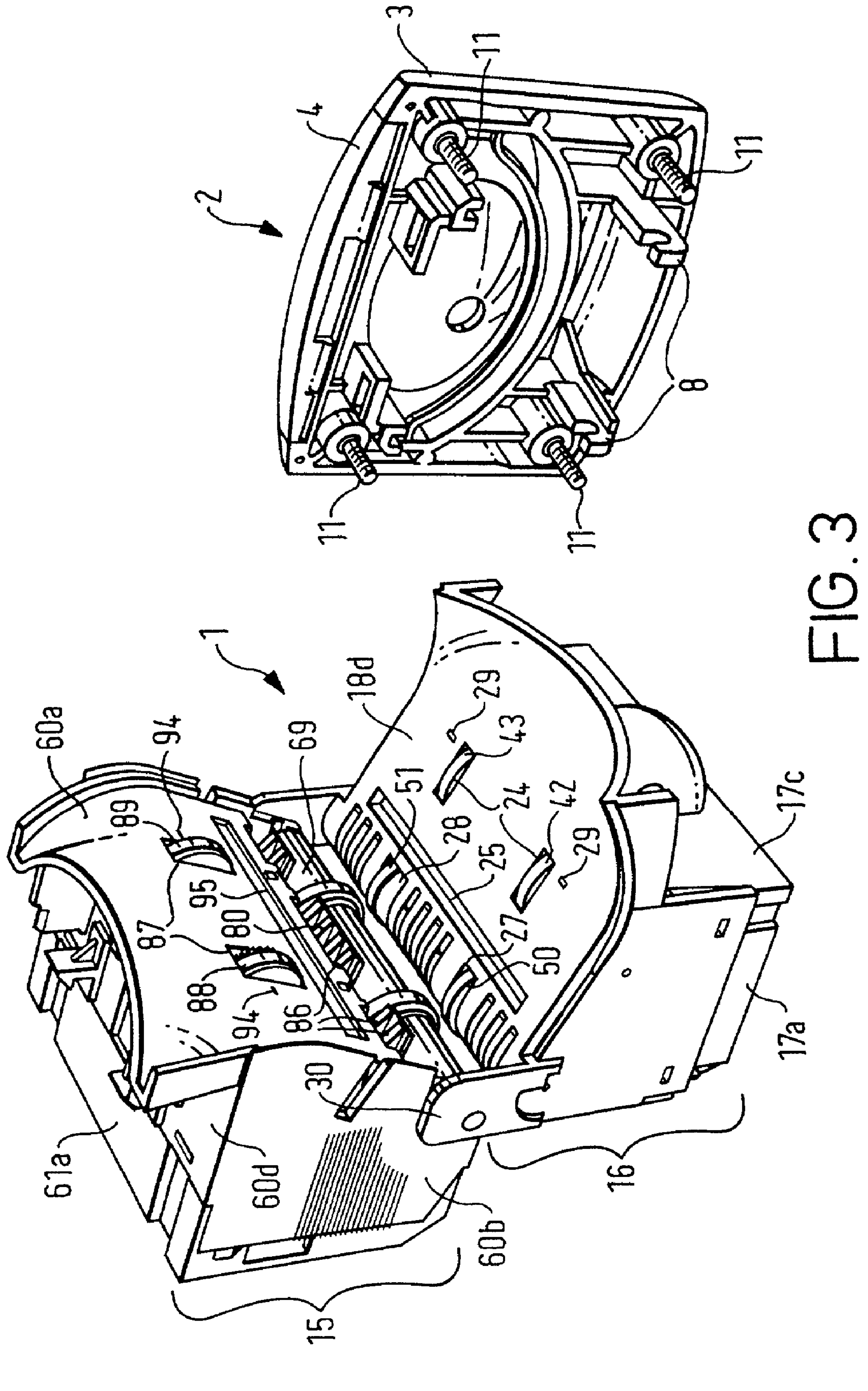
Figure 4:
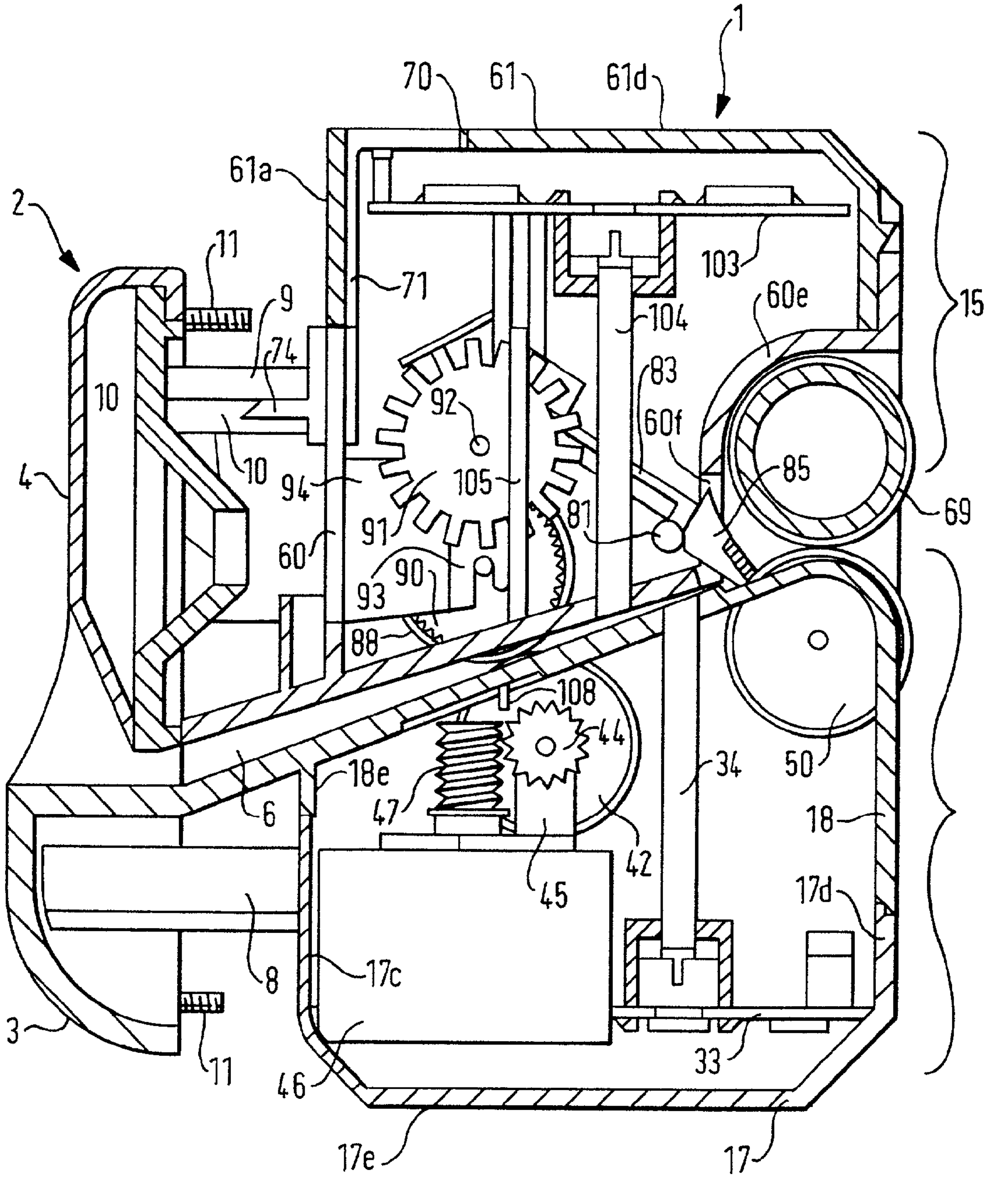
Figure 5:
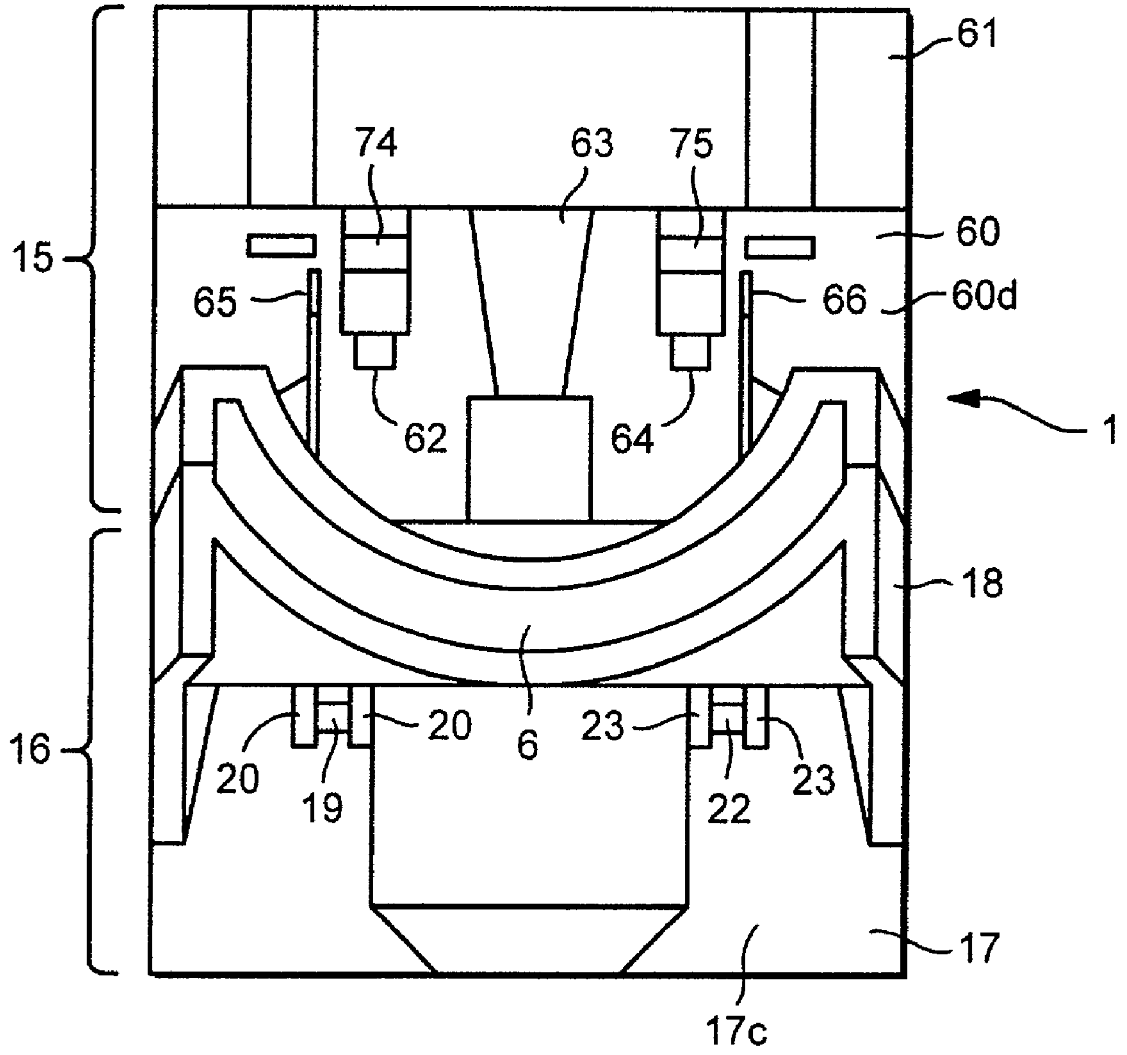
Figure 6:
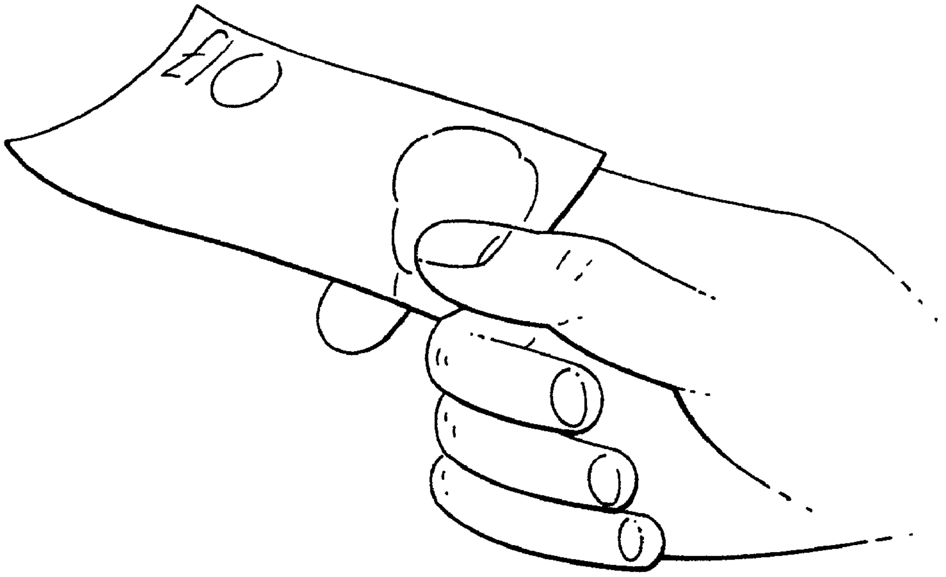
Figure 7:
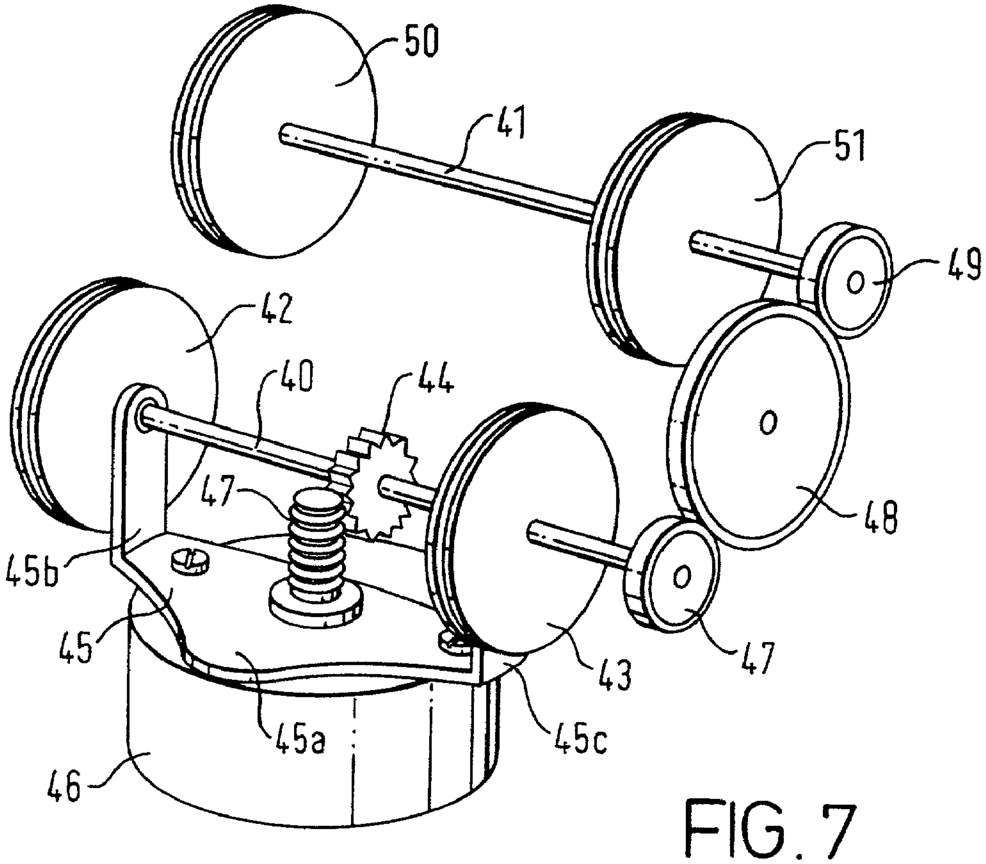
Figure 8:
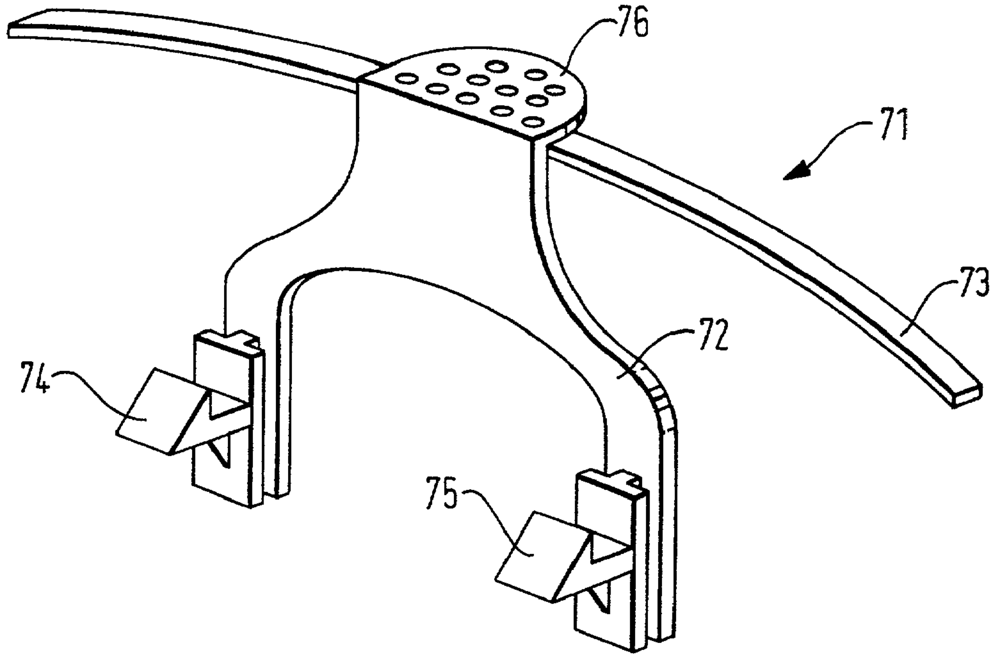
Figure 9:
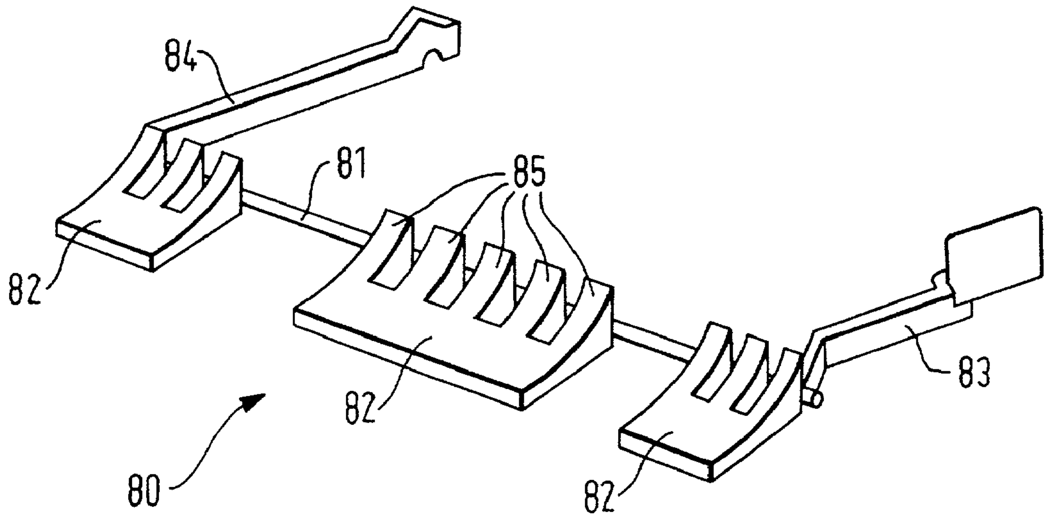
Figure 10:
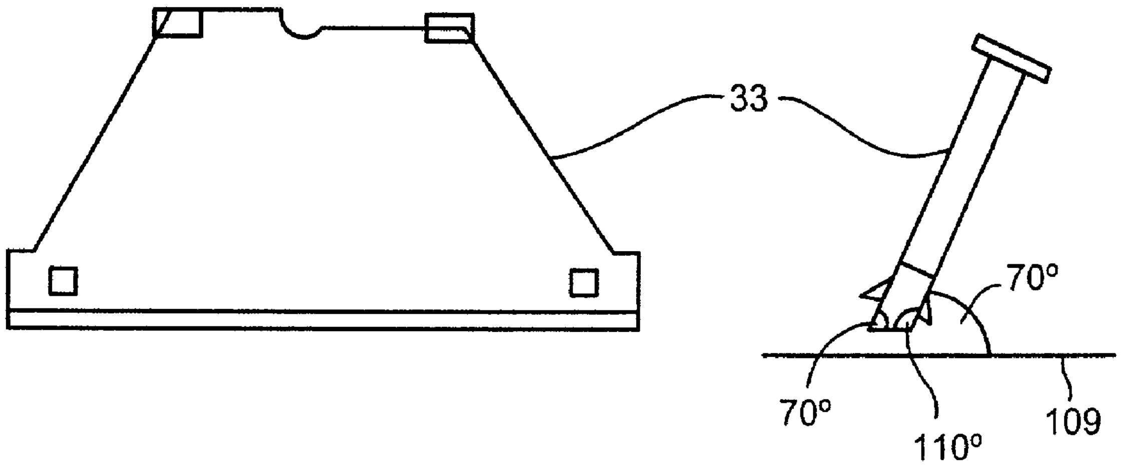
Figure 11:
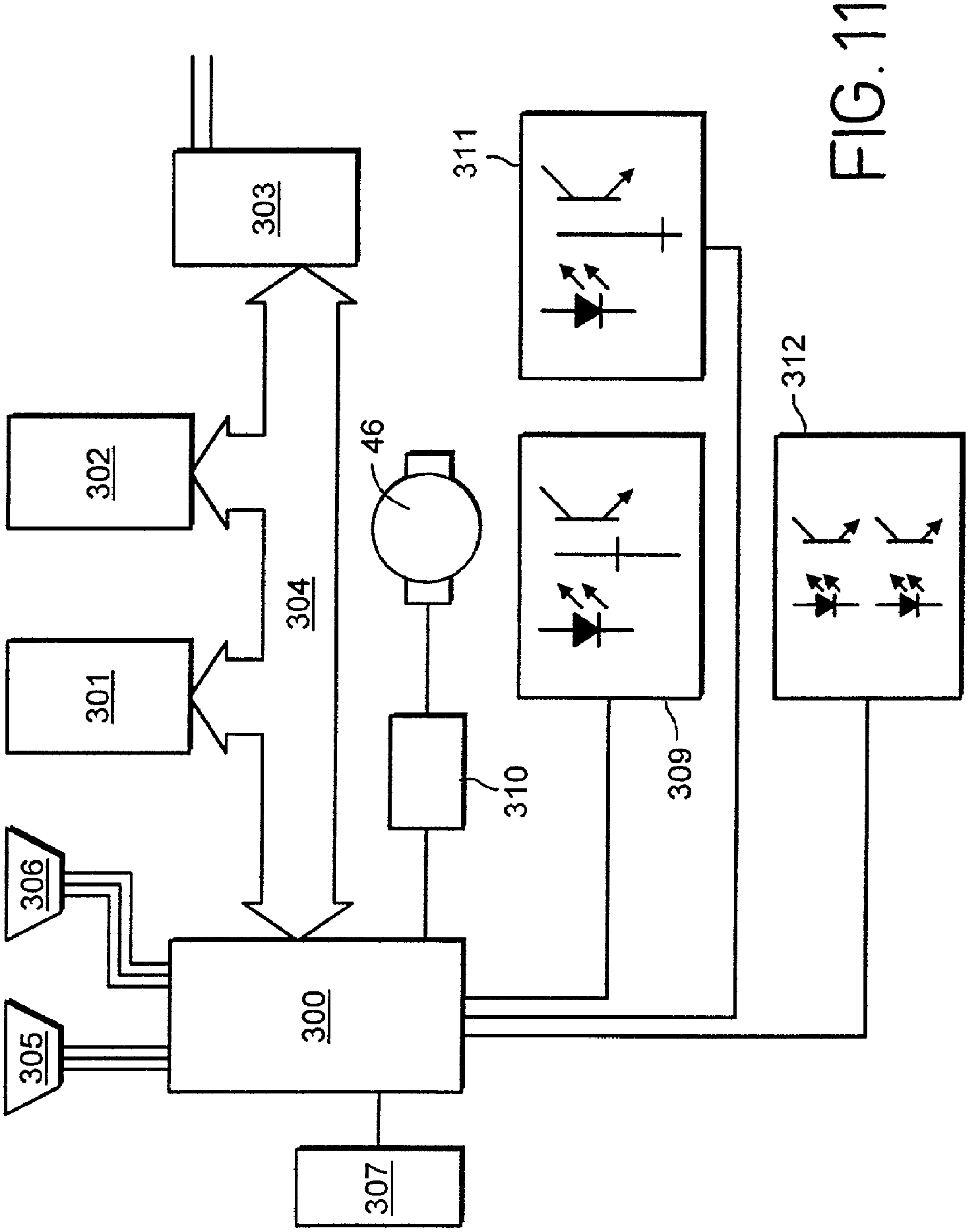
Figure 12:
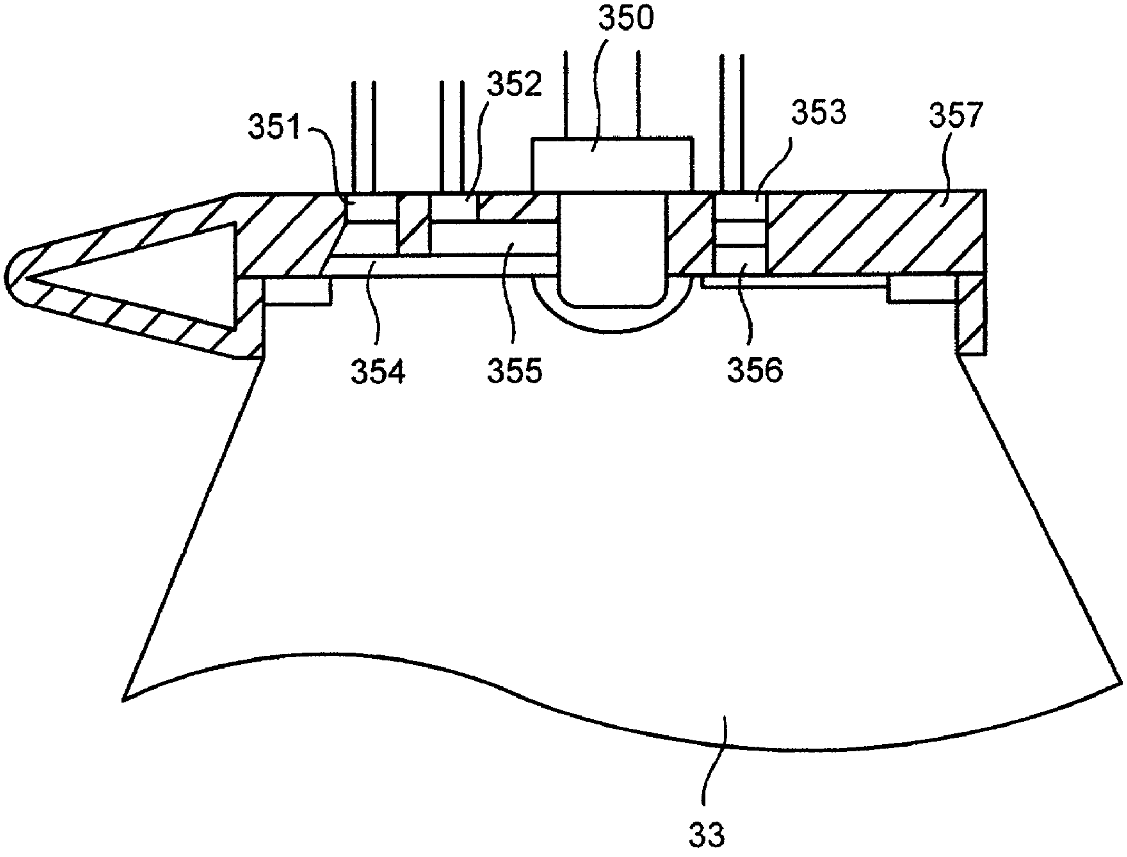
Figure 13:
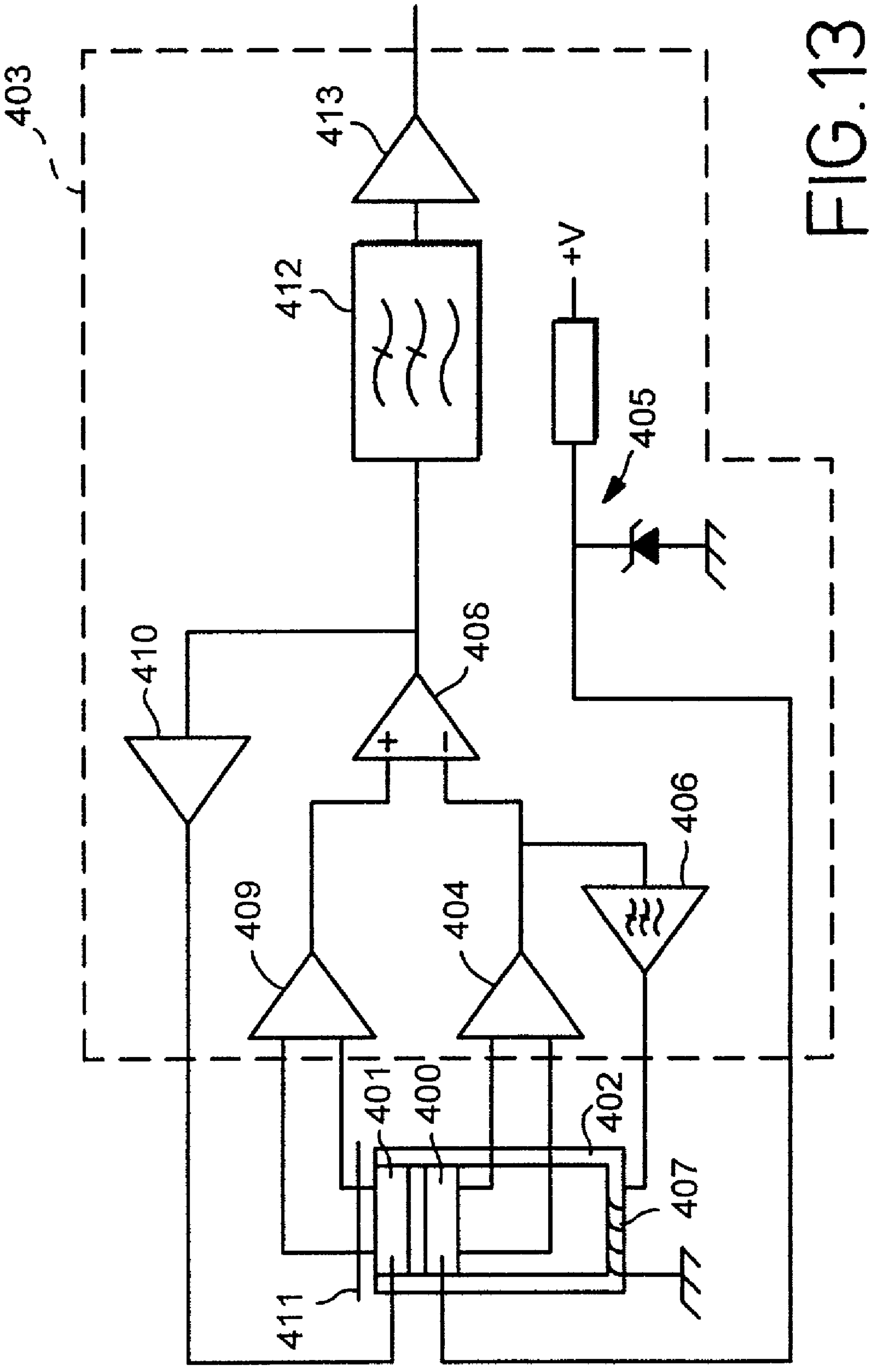
Figure 14:
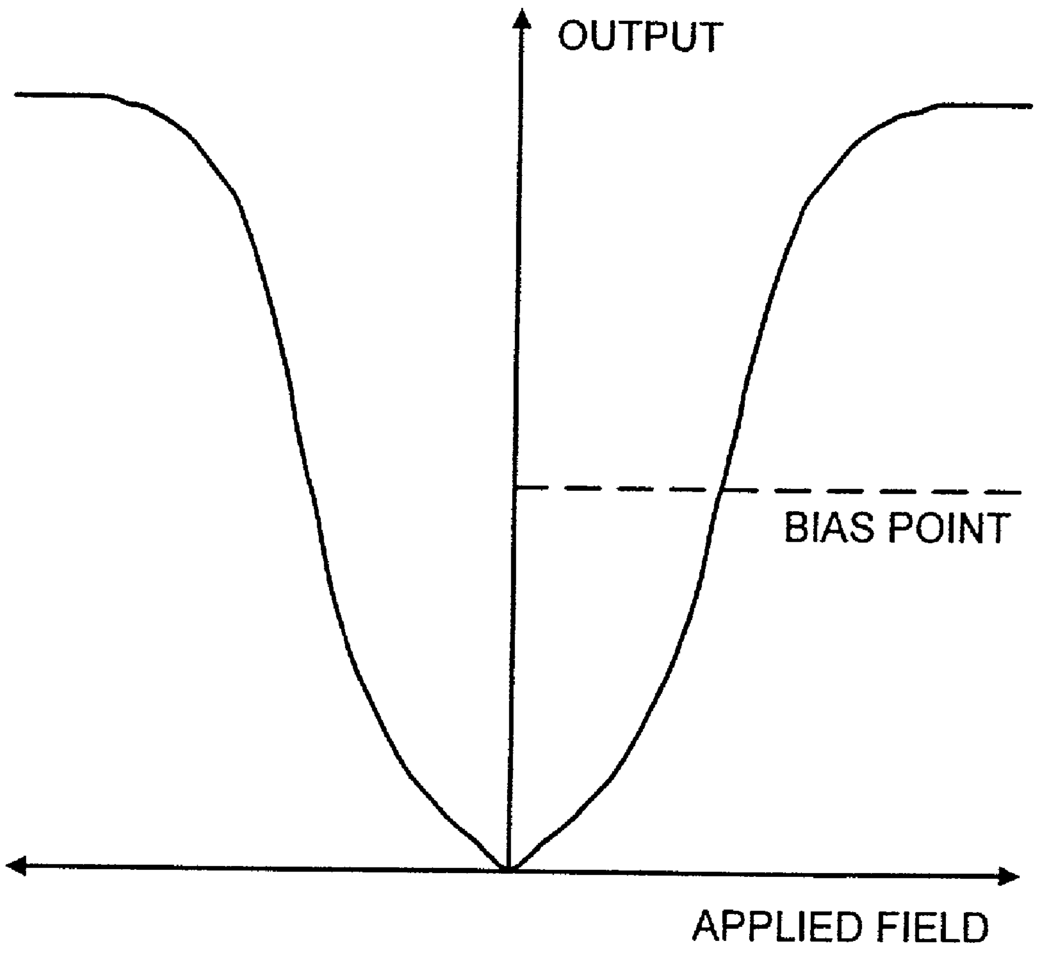
Figure 15:
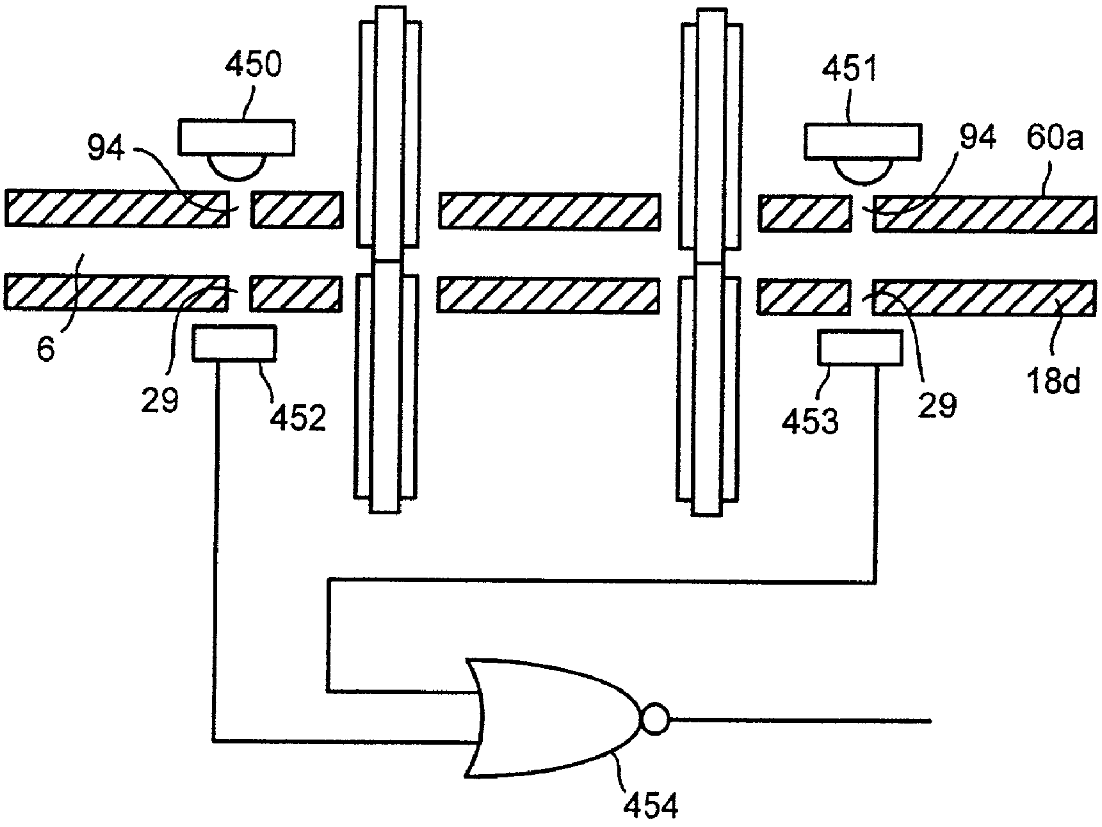

FIG. 3 an exploded view of the validator of FIG. 1;

FIG. 4 is a sectional view of the validator of FIG. 1;

FIG. 5 is a front view of the main body of the validator of FIG. 1;

FIG. 6 shows a banknote being held in a hand ready for insertion into the validator of FIG. 1;

FIG. 7 shows the banknote driving mechanism of the validator of FIG. 1;

FIG. 8 shows the main catch element of the validator of FIG. 1;

FIG. 9 shows the accept gate of the validator of FIG. 1;

FIG. 10 shows a light guide used in the validator of FIG. 1;

FIG. 11 is a block diagram of the electronics of the validator of FIG. 1;

FIG. 12 shows an optical sensor station used in the validator of FIG. 1;

FIG. 13 shows a magnetic sensor used in the validator of FIG. 1;

FIG. 14 shows the characteristic of a giant magneto-resistor device;

FIG. 15 shows the banknote detector of FIG. 11; and

FIGS. **16*a* to 16*c* illustrate acceptance of a banknote by the validator of FIG. 1; and Referring to FIGS. 1 to 5, a banknote validator according to the present invention comprises a main body 1 and a bezel 2. The bezel 2 is substantially square when viewed from the front and comprises a main part 3, moulded from opaque plastics resin material, and a translucent moulding 4** also of a plastics resin material.

The upper part of the front of the main part 3 is cut away, leaving side walls 3*a*, 3*b* extending to the top of the main part 3. The bottom 3*c* of the cut away portion is curved. The cut away portion is covered from the top of the main part 3 by the translucent moulding 4. The bottom of the translucent portion 4 is curved to define a crescent shaped opening 5 to a banknote path 6, which extends through the bezel 2 and the main body 1. The entry portion 6*a* of the banknote path flares vertically towards the opening 5. The crescent shape of the opening 5 particularly adapts it for receiving banknotes held as shown in FIG. 6.

Two hook members 8 project rearwards from the lower portion of the main part 3. Two eye members 9 project rearwards from the upper portion of the main part 3. Two guide channels 10 also project rearwards from the upper portion of the main part 3 beside respective eye members 9. Fixing studs 11 project rearwards from each corner of the bezel 3. The roles of the hook and eye members 8, 9, the guide channels 10 and the fixing studs 11 will be explained below.

The main body 1 comprises upper and lower sections 15, 16 of plastics resin material.

The lower section 16 is generally rectangular in plan and comprises a lower moulding 17 and an upper moulding 18.

The lower moulding 17 has two low side walls 17*a*, 17*b*, a front wall 17*c*, a rear wall 17*d* and a bottom wall 17*e*. The rear bottom edge of the lower moulding 17 is chamfered. The front wall 17*d* forms substantially all of the front of the lower section 16. A vertically extending central portion of the front wall 17*d* is bowed outwards. A first short rod 19, supported by flanges 20 at either end, is located to one side of the top of the bowed portion of the front wall 17*d*. A second short rod 22, supported by flanges 23 at either end, is located on the other side of the bowed portion level with the first short rod 19.

The upper moulding 18 comprises two side walls 18*a*, 18*b*, a rear wall 18*c*, an upper wall 18*d* and a shallow front wall 18*e*, and is open at the bottom. The upper wall 18*d* of the upper moulding 18 is inclined, rising towards the back of the validator, and projects forward of the front wall of the lower section 16. The upper wall 18*d* provides the floor of the banknote path 6 through the validator. The major part of the upper surface 18*d* is flat across its width. However, there is a transition region at the front of the lower section 16, where the upper wall 18*d* goes from having a transverse configuration matching the lower surface of the banknote path 6 at the back of the bezel 2 to being flat across its width. The upper wall 18*d* slopes upwards so that a banknote, inserted into the opening 5, is not stressed by the transition from bowed to flat as it travels along the banknote path 6. The junction between the upper wall 18*d* and the rear wall 18*c* is rounded.

A first pair of slots 24, one either side of the banknote path's centre line, are provided in the upper wall 18*d* where it first becomes flat. A transverse slot 25 in the upper wall 18*d* extends substantially across the whole wide of the banknote path 6, immediately in front of the rounded meeting of the upper wall 18*d* and the rear wall 18*c*. A plurality of grooves 26 extends around the rounded meeting of the upper wall 18*d* and the rear wall 18*c*. Two slots 27, 28, which are aligned with the first pair of slots 24, are provided amongst the grooves 26. A pair of small rectangular apertures 29 are located outside respective ones of the slots 24.

First and second tabs 30, 31 extend upwards from the rear margins of the side walls 18*a*, 18*b* of the upper moulding.

The upper and lower mouldings 18, 17 are press-fitted together and held by a catch 32.

The lower section 16 houses a pcb 33 that extends fully across the rear of the lower moulding 17, a first generally trapezial light guide 34 and a banknote drive mechanism. The light guide 34 is mounted at its narrow end to the pcb 33 and extends vertically so that its broad end is received in the transverse slot 25.

Referring additionally to FIG. 6, the banknote drive mechanism comprises a first shaft 40 extending approximately two thirds of the way across the lower section 16 from its righthand side and a second similar shaft 41 lying parallel to the first shaft 40. A first tired wheel 42 is mounted at the lefthand end of the first shaft 40 and a second tired wheel 43 is mounted slightly to the right of the mid-point of the first shaft 40. The first and second tired wheels 42, 43 project respectively through the first pair of slots 24 into the banknote path 6. A first spur gear 44 is mounted to the first shaft 40 midway between the first and second tired wheels 42, 43.

A cradle 45 pivotably depends from the first shaft 40. The cradle 45 comprises a cross-piece 45*a* and a pair of spaced arms 45*b*, 45*c* extending from the side edges of the cross-piece 45*a* and through which the first shaft 40 passes. An electric motor 46 is mounted to the cradle 45 by screws and the shaft of the motor 46 passes generally upwards through an aperture in the centre of the cross-piece 45*a*. A worm gear 47 is mounted to the motor's shaft and engages the first spur gear 44. Consequently, operation of the motor 46 causes the first shaft 40 to rotate.

A second spur gear 47 is mounted to the righthand end of the first shaft 40. A third spur gear 48 is mounted directly to the lower section 16 and engages the second spur gear 47.

A fourth spur gear 49 is mounted to the righthand end of the second shaft 41 and engages the third spur gear 48. Consequently, when the motor 46 operates, the first and second shafts 40, 41 are rotated in the same direction. Third and fourth tired wheels 50, 51 are mounted to the second shaft 41 aligned respectively with the first and second tired wheels 42, 43. The third and fourth tired wheels 50, 51 project through respective slots 27, 28.

The upper section 15 is generally rectangular in plan and comprises a lower moulding 60 and an upper moulding 61.

The lower moulding 60 has a bottom wall 60*a* that corresponds to the form of the upper wall 18*d* of the lower section 16 and defines the upper wall of the banknote path 6. The lower moulding 60 also has two side walls 60*b*, 60*c*, a front wall 60*d* and a rear wall 60*e*.

The front wall 60*d* is lower than the side walls 60*b*, 60*c* and has three vertical slots 62, 63, 64 extending from its upper edge. The central slot 63 enables electrical connections to be made to the bulb 7 in the bezel 2. The other slots 62, 64 are disposed symmetrically on either side of the central slot 63. A pair of vertical flanges 65, 66 are arranged one on each side of the three slots 62, 63, 64.

A stub 67 projects from the rear margin of the lefthand side wall 60*b* and is received in an aperture in the tab 30. A similar stub 68 projects from the rear margin of the righthand side wall 60*c* and is received in an aperture in the tab 31. The combination of the stubs 67, 68 and the tabs 30, 31 forms a hinge allowing the upper section 15 and the lower section 16 to be separated at the banknote path 6 for maintenance (see FIG. 3).

The rear wall 60*e* follows an arc through 90° from the back edges to the side walls 60*b*, 60*c* to the bottom of the upper section 15. A roller 69 extends across the rear of the upper section 15 within the arc of the rear wall 60*e*. The roller 69 has raised portions carrying tires which are aligned with the third and fourth tired wheels 50, 51. The lower portion of the rear wall 60*e* has three comb-shaped apertures 60*f* spaced across its width.

The upper moulding 61 has a front wall 61*a*, a rear wall 61*b*, a low lefthand side wall 61*c* and an upper wall 61*d*. The righthand side, including part of the upper wall 61*d*, of the upper moulding is cut away. The upper wall 61 has a plurality of holes for indicator lights and to provide access to controls and is chamfered at its rear, upper edge. A D-shaped aperture 70 is provided centrally at the front of the upper wall 61*d*.

Referring additionally to FIG. 8, a main catch member 71 comprises an inverted Y-shaped portion 72 and an integrally moulded, elongate spring element 73. The arms of the Y-shaped portion 72 have channels down either side which receive the sides of the outer slots 62, 64. A detent 74, 75 projects forward from each of the arms of the Y-shaped portion 72. The ends of the spring element 73 rest on the top edges of the side walls 60*b*, 60*c* of the lower moulding 60 of the upper section 15. A D-shaped flat 76 is located the top of the Y-shaped portion 72 and is received in the D-shaped aperture 70.

Referring additionally now to FIG. 9, an accept gate 80 comprises a shaft 81, rotatably mounted transversely immediately in front of the root of the rear wall 60*e* of the lower moulding 60 of the upper section 15, three banknote guiding structures 82 arranged along the shaft 81 and projecting backward, an indicator arm 83 projecting forward and upward from the lefthand end of the shaft 81 and a lever arm 84 projecting forward and upward from the other end of the shaft 81. The banknote guiding structures 82 each comprise a plurality of projections 85 linked at their distal ends. The projections 85 are generally in the form of right angle triangles, attached to the shaft 81 at their right angles. The upper edges of the projections 85 are slightly concave.

The banknote guiding structures 82 project through the comb-shaped apertures 60*f*. The undersides of the banknote guiding structures 82 have a plurality of ribs 86 arranged to be received in the grooves 26.

The distal end of the lever arm 84 is coupled to the top of the rear wall 60*e* by a spring (not shown). The spring is arranged to bias the accept gate 80 so that the ribs 86 are normally received in the grooves 26. The provision of the ribs 86 and the grooves 26 means that the accept gate 80 must be raised by an amount greater than the thickness of a banknote when a banknote passes under it. This means that the movement of the indicator arm 83 clearly signals the presence or absence of a banknote under the accept gate 80.

The lower wall 60*a* of the lower moulding 60 has a pair of slots 87 aligned respectively with the slots 24 in the upper wall of the lower section 16. A fifth tired wheel 88 is mounted in the lower moulding 60 so that it projects through the lefthand slot 87 in the lower wall of the upper section 15. A sixth tired wheel 89 is mounted in the lower moulding 60 so that it projects through the righthand slot 87 in the lower wall of the upper section 15. A gear 90 is integrally moulded with the sixth tired wheel 89 and engages a fifth spur gear (not shown). The fifth spur gear drives a toothed wheel 91 via a short shaft 92. The sixth tired wheel 89 is held in a first yoke (not shown). The first yoke has vertical channels in the outer side faces of its legs which receive the ends of L-shaped flanges 94 projecting inwards from the front wall 60*d* of the lower moulding 60 of the upper section 15. The fifth tired wheel 88 and the fifth spur gear are held by a second similar yoke 100 mounted to L-shaped flanges 94 projecting inwards from the front wall 60*d*. The toothed wheel 91 is suspended at one end of the short shaft 92 to the right of the second yoke 100.

Small apertures 94 are provided in the lower wall 60*a* in alignment with the apertures 29 in the lower section 16. A transverse slot 95 is also provided in the lower wall 60*a*.

A horizontal pcb 103 extends across the top of the lower moulding 60 of the upper section 15. A second trapezoidal light guide 104 is mounted at its narrow end to the horizontal pcb 103 and extends vertically downward so that its broad end is located in the transverse slot 95 in the lower wall 60*a* of the lower moulding 60.

A vertical pcb 105 projects down from the horizontal pcb 103 and has five vertical slots which accommodate respectively the indicator arm 83, the yokes 100, the toothed wheel 91 and the lever arm 84. Photosensors are provided on the vertical pcb 105 for detecting the position of the indicator arm 83 and the movement of the toothed wheel 96.

A magnetic sensor 108 is mounted in a recess in the underside of the upper wall 18*d* of the lower section 16, between the first and second tired wheels 42, 43.

Referring to FIG. 10, the broad ends of the light guides 34, 104 make angles of 70° and 110° respectively to the front and rear faces of the light guides 33, 104. Consequently, light guided by the light guides 34, 104 is not perpendicularly incident on a banknote 109 in the banknote path 6. The narrow ends 111 of the light guides 34, 104 have semi-circular cut-outs 112 which serve to spread light being shone therein.

The validator is mounted by first forming a rectangular aperture and four round holes in a panel. The bezel 2 is mounted to the panel by passing the fixing studs 11 through the round holes and fixing it in place with nuts on the fixing studs 11. The main body 1 is closed and offered up to the bezel 2 through the rectangular aperture. First, the hook members 8 are brought into engagement with the short rods 19, 22. Then the main body 1 is pivoted about the short rods 19, 22 so that the vertical flanges 65, 66 are received into the guide channels 10. The main body 1 is pivoted further until the detents 74, 75 engage respective eye members 9. Thus, the bezel 2 serves to both mount the main body 1 to a panel and to hold the upper and lower sections 15, 16 together.

The main body 1 can be removed for maintenance by depressing the D-shaped flat 76, which causes the detents 74, 75 to disengage from the eye members 9, pivoting the main body 1 back about the short rods 19, 22 until the vertical flanges 65, 66 are clear and then unhooking the hook members 8 from the short rods 19, 22.

The electronic circuits in the upper and lower sections 15, 16 are connected by a flying lead (not shown) outside the main body 1.

Referring to FIG. 11, the electronics of the validator is distributed over the pcbs 33, 103, 105 and comprises a microcontroller 300, which includes means for digitising five input signals, an EEPROM 301 storing program and banknote data, a RAM 302, a I/O device 303 and a bus 304 connecting the microcontroller 300, the EEPROM 301, the RAM 302 and the I/O device 303. The I/O device 303 provides the means whereby the EEPROM 301 can be reprogrammed and whereby control and reporting signals can be output from the validator.

Several sub-circuits are connected directly to the microcontroller 300. These comprise first and second optical sensors 305, 306, a magnetic sensor unit 307, a motion sensor 309, a motor control circuit 310, an accept gate sensor 311 and a banknote detector 312. The motor control circuit 310 simply comprises a motor current supply switching device which is controlled by a signal from the microcontroller 300. The motion sensor 309 comprises an LED and a phototransistor. The LED and the phototransistor are arranged on opposite sides of the toothed wheel 96 on the vertical pcb 105 so that the teeth on the toothed wheel 96 interrupt the beam of light from the LED to the phototransistor.

Referring to FIG. 12, the first optical sensor 305 comprises a "white light" LED 350, a first phototransistor 351, a second phototransistor 352, a third phototransistor 353, a first filter 354, a second filter 355 and a third filter 356 all of which are mounted in one half of a hinged carrier 357. The second filter 355 is arranged in series with part of the first filter 354. The first and third filters have 3 dB stopbands of 420–720 nm. The second filter has 3 dB stopbands of 480–540 nm together with >820 nm. The "white light" LED 350 radiates a significant amount of light at infrared wavelengths.

The narrow end of the first trapezoidal light guide 34 is received in the other half of the carrier 356. Light from the LED 350 is guided by the light guide 34 to the banknote path 6 and light reflected by a banknote in the banknote path 6 is guided by the light guide 34 to the first, second and third filters 354, 355, 356. The reflected light passing through the first filter 354 only is incident on the first phototransistor 351. The reflected light passing through the first filter 354 and the second filter 355 is incident on the second phototransistor 352. The reflected light passing through the third filter 354 only is incident on the third phototransistor 353.

The second optical sensor 306 is similarly constructed in association with the second light guide 104.

Referring to FIG. 13, the first magnetic sensor 307 comprises first and second giant magneto-resistors 400, 401, mounted one above the other in a yoke 402, and control and output circuitry 403.

The first giant magneto-resistor 400 is connected between the inputs of a first operational amplifier 404 and is supplied with a fixed bias voltage from a reference voltage source 405. The output of the first operational amplifier 404 is fed to the input of a low-pass filter 406. The low-pass filter 406 drives a bias coil 407, wound on the yoke 402. The output of the first operational amplifier 404 is also fed to the inverting input of a second operational amplifier 408 which is configured as a subtracter. The second giant magneto-resistor 401 is connected between the inputs of a third operational amplifier 409. The output of the third operational amplifier 409 is fed to the non-inverting input of the second operational amplifier 408. The output of the second operational amplifier 408 is amplified by a fourth operational amplifier 410 and applied to the second giant magneto-resistor 401 as its electrical bias. The fourth operational amplifier 410 is configured to alter the bias of the second giant magneto-resistor 401 so that the output of the second operational amplifier 408 will be zero. However, the response is arranged to be too slow to affect signals caused by a passing banknote 411. The output of the second operational amplifier 408 is also applied to the input of a two pole Butterworth low-pass filter 412 which has a first −3 dB point at 15 Hz. The output of the two pole low-pass filter 412 is fed to a two-stage amplifier 413. The bandwidths of both stages of the two-stage amplifier 413 are limited to ensure good noise performance. The output of the two-stage amplifier 413 is input to an analogue-to-digital converter input of the microcontroller 300.

The operation of the magnetic sensor unit 400 will now be described with reference to FIG. 13.

Giant magneto-resistor devices have the characteristic shown in FIG. 14. It is clear that such devices are most sensitive when a bias field is applied so that the device operates in the steepest part of its characteristic curve. The bias coil 407 is used to bias the giant magneto-resistors 400, 401 at this point.

The bias field is set to the required value by adjusting the current through the bias coil 407. If the current is set to a constant value then any large external field will move the bias point and could saturate the sensor. To avoid this problem the current through the bias coil 407 is set by the feedback loop comprising the first giant magneto-resistor 400, the first operational amplifier 404 and the low-pass filter 406. The frequency response of this feedback loop has a low-pass characteristic with a first order roll-off from a −3 dB point at 2 Hz. This ensures that only constant and slowly changing magnetic fields are compensated for. In other words, the loop does not respond to signals caused by banknotes 411 passing the sensor.

The two giant magneto-resistors 400, 401 are used together in order to compensate for faster changing fields. Both of the giant magneto-resistors 400, 401 are subject to the bias field produced by the bias coil 407.

The output of the first giant magneto-resistor 400 is subtracted from the output of the second giant magneto-resistor 401 by the second operational amplifier 408. Consequently, any changing fields which act on both giant magneto-resistors 400, 401 will result in a zero output from the second operational amplifier 408. When a banknote passes the sensor, the second giant magneto-resistor 401 is closer to the banknote 411 and is subject to a much greater field from the banknote 411 (assuming that it is printed with magnetic ink) than the first giant magneto-resistor 400. As a result, the output of the second operational amplifier 408 is non-zero and representative of the magnetic field produced by the banknote 411.

In order for this arrangement to operate correctly, the characteristics of the giant magneto-resistors 400, 401 and their amplifiers 404, 409 must be matched. The sensitivity of a giant magneto-resistor is proportional to its electrical bias so, by fixing the bias of the first giant magneto-resistor 400 and varying the bias of the second giant magneto-resistor 401, their sensitivities can be matched. A second feedback loop, comprising the third operational amplifier 409, the second operational amplifier 408 and the fourth operational amplifier 410, is used to set the electrical bias of the second giant magneto-resistor 401. This loop aims to set the variable bias so that the output of the second operational amplifier 408 is zero.

The accept gate sensor 311 comprises an LED and a phototransistor mounted to the vertical pcb 105 so that the beam of light from the LED to the phototransistor is interrupted when the indicator arm 83 of the accept gate 80 drops as a banknote passes under the accept gate 80.

Referring to FIG. 15, the banknote detector 312 comprises first and second IR LEDs 450, 451 which are mounted to the vertical pcb 105. The IR LEDs 450, 451 are aligned with the small apertures 94, 29 in the upper and lower walls 60*a*, 18*d* of the banknote path 6. First and second photodetectors 452, 453 are located in the lower section 16 and are aligned with respective IR LEDs 450, 451. The outputs of the photodetectors 452, 453 are fed to the inputs of a NOR-gate 454. The output of the NOR-gate 454 is fed to the input of the microcontroller 300.

When a banknote is inserted into the banknote path 6, the beams from the IR LEDs 450, 451 are cut. Consequently, the inputs to the NOR-gate 454 both go low, causing the output of the NOR-gate 454 to go high. Under all other conditions, the output of the NOR-gate 454 remains low.

The process of validating a banknote will now be described.

When the validator is installed for operation, the microcontroller 300 performs an initial test routine.

The microcontroller 300 continuously monitors the output of the banknote detector 312 which will normally be low. However, when a banknote is inserted, the beams from the IR LEDs 450, 451 are broken and the microcontroller 300 receives a high signal from the banknote detector 312. The microcontroller 300 responds to this by driving the motor 46 so as to draw the banknote into the validator.

A user must manually insert a banknote into the banknote path 6 until the leading edge of the banknote reaches the first and second tired wheels 42, 43, at which point the banknote detector 312 output goes high and the motor 46 starts. The leading edge of the banknote is then gripped between the first and second tired wheels 42, 43 and the fifth and sixth tired wheels 88, 89, and then driven along the banknote path 6 by the first and second tired wheels 42, 43.

Once the motor 46 has been started, the microcontroller 300 begins to sample the output of the magnetic sensor unit 307.

The microcontroller 300 also continuously monitors the output of the first optical sensor 305 until a change in one or both outputs indicates that the leading edge of the banknote has reached the first light guide 34. From this point on, the microprocessor 300 repeatedly samples and stores in the RAM 302 the outputs of the optical sensors 305, 306 and the magnetic sensor 307. The sampling terminates when one or both of the outputs of the second optical sensor 306 indicate that the banknote has completely passed the second light guide 104. The sampling of the outputs of the optical and magnetic sensors 305, 306, 307 is synchronised with the movement of the banknote along the banknote path 6 which is sensed by the motion sensor 309.

The samples S1, S2 and S3 of the outputs of respectively the first, second and third phototransistors 351, 352, 353 of the optical sensors 305, 306 are processed according to stored algorithms to produce the values to be compared with stored reference values.

Figure 16A:
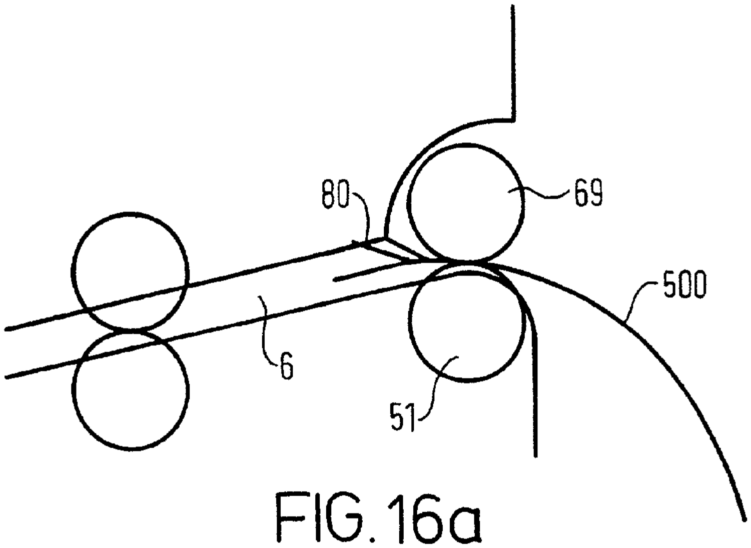

When the banknote has left the second light guide 104, the microcontroller 300 stops the motor 46. At this point, the banknote 500 extends under the accept gate 80 and is gripped between the third and fourth tired wheels 50, 51 and the roller 68 (FIG. 16*a*).

Figure 16B:
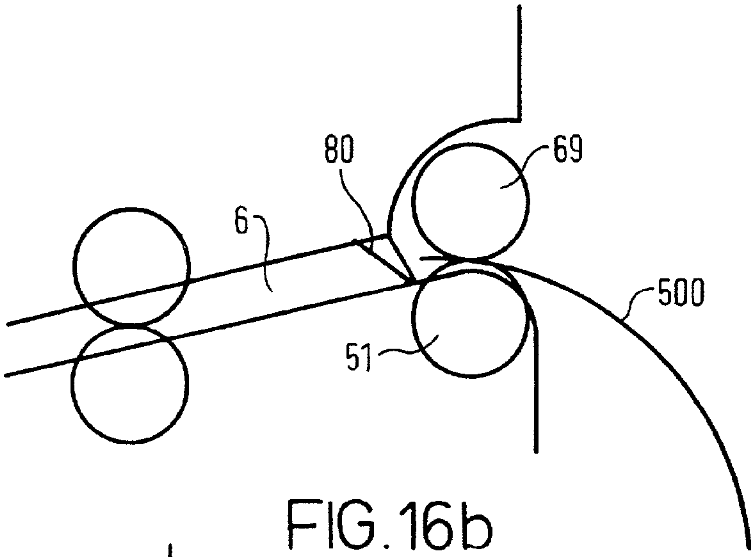
Figure 16C:
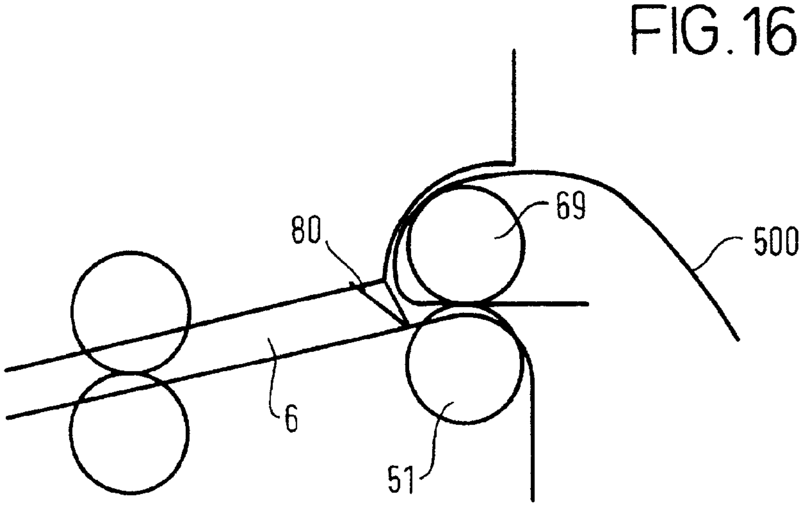

Referring to FIG. 17, while the motor 46 is stopped, the microcontroller 300 determines whether the proffered banknote is acceptable. The optical and magnetic data derived from the optical and magnetic sensor outputs are then correlated with reference sample sets, stored in the EEPROM 301, by the microcontroller 300 (step s3). If the proffered banknote 500 is determined to be acceptable, the microcontroller 300 drives the motor 46 forward until the indicator arm 83 rises, indicating that the banknote has passed beyond the accept gate 80 FIG. 16*b*). At this point, the banknote is held between the third and fourth tired wheels 50, 51 and the roller 69. The motor 46 is then reversed and the banknote is driven backwards. However, the banknote cannot travel back along the banknote path 6 because the accept gate 80 has fallen. Instead, the banknote is guided up by the accept gate 80 so that is travels up and back so that it exits the back of the validator over the top of the roller 69 FIG. 16*c*).

If, while the banknote 500 is under the accept gate 80, the microcontroller 300 determines that it is not acceptable, the microcontroller 300 simply reverses the motor 46, driving the banknote back along the banknote path 6 to the user or would-be fraudster.

The fifth tired wheel 88 bears against and is driven by a banknote in the banknote path 6, or, if the banknote has passed, the first tired wheel 42, causing the toothed wheel 96 of the motion sensor 309 to rotate. While the motor 46 is running, the microcontroller 300 monitors the output of motion sensor 309. If the validator is operating correctly, the microcontroller 300 should be receiving a stream of pulses from the motion sensor 309. The microcontroller 300 checks for the presence of pulses and the frequency of any pulse stream received. If no pulses are present or the frequency of the pulse stream is wrong, the microcontroller 300 determines that there is a fault in the motor 46 or a fraud is being attempted.

It will be appreciated that many modifications may be made to the above-described embodiment. For instance, if only the accept gate arrangement is the be employed, the banknote path need not have a curved opening.

What is claimed is:

1. A banknote validator comprising:

a banknote path, said banknote path comprising a banknote insertion path in communication with a banknote acceptance path;

a reversible banknote driving means for driving a banknote along said banknote path;

a non-return gate provided in said banknote path, said non-return gate comprising a pivotably mounted flap means biased into said banknote path;

banknote characteristic sensing means for sensing a characteristic of the banknote; and processing means operatively connected with the sensing means and arranged to reject or accept a banknote, said processing means being responsive to the output of said banknote characteristic sensing means to identify an acceptable banknote; wherein said reversible driving means is arranged to reverse if a banknote is identified as being acceptable after the accepted banknote has cleared said non-return gate such that said accepted banknote passes along said banknote acceptance path, and wherein said reversible driving means is arranged to reverse if a banknote is determined as not being acceptable before the rejected banknote has cleared said non-return gate such that said rejected banknote passes back along said banknote insertion path.

2. A banknote validator as claimed in claim 1, wherein said non-return gate extends substantially completely across the width of the banknote path.

3. A banknote validator as claimed in claim 1, wherein said pivotally mounted flap means comprises an edge with at least one projection, said at least one projection being receivable into at least one complimentary depression in said banknote path.

4. A banknote validator as claimed in claim 1, wherein said non-return gate is angled in the direction of banknote travel along the insertion path, prior to reversal of said banknote driving means.

5. A banknote validator as claimed in claim 1, wherein the non-return gate comprises a banknote guiding portion arranged for guiding said acceptable banknote along said banknote acceptance path.

6. A banknote validator as claimed in claim 5, wherein said banknote guiding portion defines one surface of a plurality of surfaces, which when arranged side by side define said banknote acceptance path.

7. A banknote validator as claimed in claim 5, wherein the banknote guiding means is curved in the direction of banknote travel to as to facilitate movement of a banknote along said banknote acceptance path.

8. A banknote validator comprising:

a banknote path, said banknote path comprising a banknote insertion path in communication with a banknote acceptance path;

a reversible banknote driving means for driving a banknote along said banknote path;

a non-return gate provided in said banknote path, said non-return gate comprising a pivotably mounted flap means biased into said banknote path, with an edge of said pivotally mounted flap means comprising at least one projection, said at least one projection being receivable in at least one complimentary depression in the banknote path;

banknote characteristic sensing means for sensing a characteristic of the banknote; and processing means operatively connected with the sensing means and arranged to reject or accept a banknote, said processing means being responsive to the output of said banknote characteristic sensing means to identify an acceptable banknote; wherein said reversible driving means is arranged to reverse if a banknote is identified as being acceptable after the accepted banknote has cleared said non-return gate such that said accepted banknote passes along said banknote acceptance path, and said reversible driving means is arranged to reverse if a banknote is determined as not being acceptable before the rejected banknote has cleared said non-return gate such that said rejected banknote passes back along said banknote insertion path.

9. A banknote validator as claimed in claim 8, wherein the non-return gate extends substantially completely across the width of the banknote path.

10. A banknote validator as claimed in claim 8, wherein said edge of said pivotally mounted flap means comprises a plurality of projections, said plurality being received into a plurality of complimentary depressions in the banknote path.

11. A banknote validator as claimed in claim 10, wherein said plurality of projections are rib formations.

12. A banknote validator as claimed in claim 10, wherein said plurality of complimentary depressions are groove formations.

13. A banknote validator as claimed in claim 8, wherein said non-return gate is angled in the direction of banknote travel along the insertion path, prior to reversal of said banknote driving means.

14. A banknote validator as claimed in claim 8, wherein the non-return gate comprises a banknote guiding portion arranged for guiding said acceptable banknote along said banknote acceptance path.

15. A banknote validator as claimed in claim 14, wherein said banknote guiding portion defines one surface of a plurality of surfaces, which when arranged side by side define said banknote acceptance path.

16. A banknote validator as claimed in claim 14, wherein the banknote guiding means is curved in the direction of banknote travel to as to facilitate movement of a banknote along said banknote acceptance path.

17. A banknote validator comprising:

a banknote path, said banknote path comprising a banknote insertion path in communication with a banknote acceptance path;

banknote characteristic sensing means for sensing a characteristic of the banknote;

processing means operatively connected with the sensing means and arranged to reject or accept a banknote, said processing means being responsive to the output of said banknote characteristic sensing means to identify an acceptable banknote;

a reversible banknote driving means for driving a banknote along said banknote path, operation of said driving means being controlled by said processing means; and a non-return gate provided in said banknote path, said non-return gate comprising a pivotably mounted flap means biased into said banknote path; wherein said processing means is arranged to control the timing of a reversal of said driving means such that if a banknote is identified as being acceptable, said reversible driving means can be reversed after the accepted banknote has cleared said non-return gate such that the accepted banknote can be progressed to said banknote acceptance path, and if a banknote is determined as not being acceptable, said reversible driving means can be reversed before the rejected banknote has cleared said non-return gate, such that enabling the rejected banknote can be returned along said banknote insertion path.

18. A banknote validator as claimed in claim 17, wherein said non-return gate extends substantially completely across the width of the banknote path.

19. A banknote validator as claimed in claim 17, wherein a banknote engaging portion of said pivotally mounted flap means comprises at least one projection, said at least one projection being receivable in at least one complimentary depression in the banknote path.

20. A banknote validator as claimed in claim 17, wherein said non-return gate is angled in the direction of banknote travel along the insertion path prior to reversal of said banknote driving means.

21. A banknote validator as claimed in claim 17, wherein the non-return gate comprises a banknote guiding portion arranged for guiding said acceptable banknote along said banknote acceptance path.

22. A banknote validator as claimed in claim 21, wherein said banknote guiding portion defines one surface of a plurality of surfaces, which when arranged side by side define said banknote acceptance path.

23. A banknote validator as claimed in claim 21, wherein the banknote guiding means is curved in the direction of banknote travel to as to facilitate movement of a banknote along said banknote acceptance path.

24. A banknote validator comprising:

a banknote path, said banknote path comprising a banknote insertion path in communication with a banknote acceptance path;

a reversible banknote driving means for driving a banknote along said banknote path;

a non-return gate provided in said banknote path, said non-return gate comprising a pivotably mounted flap means biased into said banknote path and a banknote guiding portion arranged for guiding said acceptable banknote along said banknote acceptance path;

banknote characteristic sensing means for sensing a characteristic of the banknote; and processing means operatively connected with the sensing means and arranged to reject or accept a banknote, said processing means being responsive to the output of said banknote characteristic sensing means to identify an acceptable banknote; wherein said reversible driving means is arranged to reverse if a banknote is identified as being acceptable after the accepted banknote has cleared said non-return gate such that said accepted banknote passes along said banknote acceptance path, and said reversible driving means is arranged to reverse if a banknote is determined as not being acceptable before the rejected banknote has cleared said non-return gate such that said rejected banknote passes back along said banknote insertion path.

25. A banknote validator as claimed in claim 24, wherein said non-return gate extends substantially completely across the width of the banknote path.

26. A banknote validator as claimed in claim 24, wherein a banknote engaging portion of said pivotally mounted flap means comprises at least one projection, said at least one projection being receivable in at least one complimentary depression in the banknote path.

27. A banknote validator as claimed in claim 24, wherein said non-return gate is angled in the direction of banknote travel along the insertion path prior to reversal of said banknote driving means.

28. A banknote validator as claimed in claim 24, wherein said banknote guiding portion defines one surface of a plurality of surfaces, which when arranged side by side define said banknote acceptance path.

29. A banknote validator as claimed in claim 24, wherein said banknote guiding means is curved in the direction of banknote travel to as to facilitate movement of a banknote along said banknote acceptance path.

30. A banknote validator comprising:

a body having a first portion defining a banknote insertion path and a second portion defining a banknote acceptance path, the first portion being provided adjacent the second portion such that the banknote insertion path is in communication with the banknote acceptance path to define an overall banknote path, a non-return gate provided substantially at a junction between the first and second portions, the non-return gate intersecting the banknote insertion path and comprising a pivotally mounted flap means biased into the banknote insertion path; wherein the second portion comprises a rotatable banknote guide and a complimentary guide wall which together define a part of the banknote acceptance path;

a reversible banknote driving means for driving a banknote along said banknote path;

banknote characteristic sensing means for sensing a characteristic of the banknote; and processing means operatively connected with the sensing means and arranged to reject or accept a banknote, said processing means being responsive to the output of said banknote characteristic sensing means to identify an acceptable banknote; wherein said reversible driving means is arranged to reverse if a banknote is identified as being acceptable after the accepted banknote has cleared said non-return gate such that said accepted banknote passes along said banknote acceptance path, and said reversible driving means is arranged to reverse if a banknote is determined as not being acceptable before the rejected banknote has cleared said non-return gate such that said rejected banknote passes back along said banknote insertion path.

31. A banknote validator as claimed in claim 30, wherein said banknote driving means comprises a banknote driving wheel in contact with said rotatable banknote guide, such that in use an acceptable banknote is guided along said banknote acceptance path up and rearwardly over said rotatable banknote guide when said banknote driving means is reversed.

32. A banknote validator as claimed in claim 30, wherein said non-return gate extends substantially completely across the width of said banknote insertion path.

33. A banknote validator as claimed in claim 30, wherein said pivotally mounted flap means comprises an edge with at least one projection, said at least one projection being receivable into at least one complimentary depression in said banknote path.

34. A banknote validator as claimed in claim 30, wherein said non-return gate is angled in the direction of banknote travel along the insertion path, prior to reversal of said banknote driving means.

35. A banknote validator as claimed in claim 30, wherein the non-return gate comprises a banknote guiding portion arranged for guiding said acceptable banknote along said banknote acceptance path.

36. A banknote validator as claimed in claim 35, wherein said banknote guiding portion defines one surface of a plurality of surfaces, which when arranged side by side define said banknote acceptance path.

37. A banknote validator as claimed in claim 35, wherein the banknote guiding means is curved in the direction of banknote travel to as to facilitate movement of a banknote along said banknote acceptance path.

* * * * *